United States Patent
Gao et al.

(10) Patent No.: US 11,416,086 B2
(45) Date of Patent: Aug. 16, 2022

(54) SENSOR DESIGN FOR CAPACITANCE SENSING

(71) Applicant: Apple Inc., Cupertino, CA (US)

(72) Inventors: Kanke Gao, Fremont, CA (US); Wei Hsin Yao, Palo Alto, CA (US); Yingxuan Li, Saratoga, CA (US); Weijun Yao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/581,728

(22) Filed: Sep. 24, 2019

(65) Prior Publication Data

US 2020/0019275 A1  Jan. 16, 2020

Related U.S. Application Data

(63) Continuation of application No. 15/094,970, filed on Apr. 8, 2016, now Pat. No. 10,437,385.
(Continued)

(51) Int. Cl.
  *G06F 3/041* (2006.01)
  *G06F 3/0354* (2013.01)
  *G06F 3/044* (2006.01)

(52) U.S. Cl.
  CPC ........ *G06F 3/03545* (2013.01); *G06F 3/0412* (2013.01); *G06F 3/0418* (2013.01); *G06F 3/0443* (2019.05); *G06F 3/0448* (2019.05); *G06F 3/04166* (2019.05); *G06F 2203/04103* (2013.01)

(58) Field of Classification Search
  CPC .. G06F 3/03545; G06F 3/0412; G06F 3/0416; G06F 3/0418; G06F 3/044; G06F 2203/04103
  See application file for complete search history.

(56) References Cited

U.S. PATENT DOCUMENTS 5,483,261 A   1/1996  Yasutake
5,488,204 A   1/1996  Mead et al.
(Continued)

FOREIGN PATENT DOCUMENTS

JP   2000-163031 A   6/2000
JP   2002-342033 A   11/2002

OTHER PUBLICATIONS

Final Office Action received for U.S. Appl. No. 15/094,970, dated Dec. 14, 2018, 12 pages.
(Continued)

*Primary Examiner* — Stacy Khoo
(74) *Attorney, Agent, or Firm* — Kubota & Basol LLP

(57) ABSTRACT

Electrode configurations for reducing wobble error for a stylus translating on a surface over and between electrodes of a touch sensor panel are disclosed. In some examples, electrodes associated with a more linear signal profile are correlated with lower wobble error. In some examples, electrodes can have projections which can interleave with projections of adjacent electrodes. In some configurations, projections of adjacent electrodes can be interleaved in one-dimension; in other configurations, projections of adjacent electrodes can be interleaved in two-dimensions. In some configurations, the width and length of one or more projections in an electrode can be selected based on a desired signal profile for that electrode.

24 Claims, 11 Drawing Sheets

Related U.S. Application Data

(60) Provisional application No. 62/154,057, filed on Apr. 28, 2015.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 9,391,610 | B2 * | 7/2016 | Gourevitch ........... G06F 3/0448 |
| 2006/0197753 | A1 | 9/2006 | Hotelling |
| 2009/0194344 | A1 * | 8/2009 | Harley ................... G06F 3/044 178/18.06 |
| 2010/0292945 | A1 * | 11/2010 | Reynolds ................ G06F 3/044 702/65 |
| 2011/0073384 | A1 * | 3/2011 | Osoinach ................ G06F 3/044 178/18.06 |
| 2015/0091842 | A1 * | 4/2015 | Shepelev ............ G06F 3/04184 345/174 |
| 2015/0227229 | A1 | 8/2015 | Schwartz et al. |
| 2016/0320913 | A1 | 11/2016 | Gao et al. |

OTHER PUBLICATIONS

First Action Interview Office Action received for U.S. Appl. No. 15/094,970, dated Jun. 14, 2018, 19 pages.

Lee et al., "A Multi-Touch Three Dimensional Touch-Sensitive Tablet", CHI'85 Proceedings, Apr. 1985, pp. 21-25.

Notice of Allowance received for U.S. Appl. No. 15/094,970, dated May 31, 2019, 5 pages.

Pre-Interview First Office Action received for U.S. Appl. No. 15/094,970, dated Jan. 4, 2018, 16 pages.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Rubine, Dean, "Combining Gestures and Direct Manipulation", CHI'92, May 3-7, 1992, pp. 659-660.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

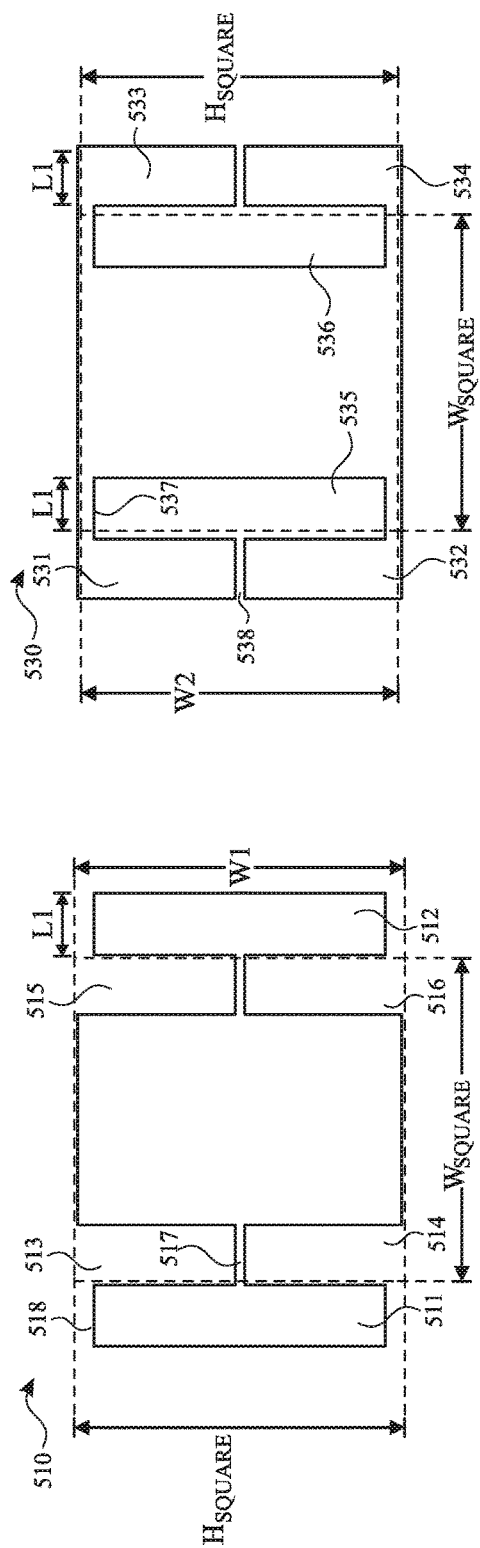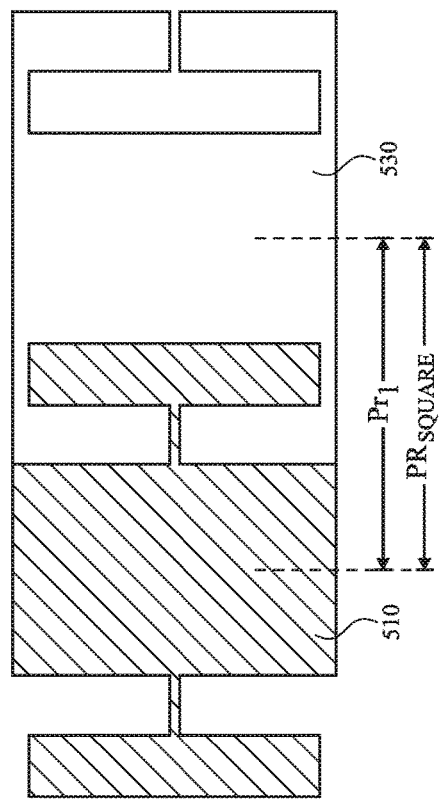
FIG. 5A
FIG. 5B

SENSOR DESIGN FOR CAPACITANCE SENSING

CROSS-REFERENCE TO RELATED APPLICATION

This application is a continuation of U.S. application Ser. No. 15/094,970, filed Apr. 8, 2016 and published on Nov. 3, 2016 as U.S. Patent Publication No. 2016-0320913, which claims the benefit under 35 U.S.C. § 119(e) of U.S. Provisional Patent Application No. 62/154,057, filed Apr. 28, 2015, the contents of which are incorporated by reference herein in their entirety for all purposes.

FIELD OF THE DISCLOSURE

This relates generally to touch sensor panels, and more particularly, to a touch sensor panel in which touch sensors have interleaving projections in order to improve position calculation.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. The effectiveness of a stylus, however, can depend on the ability to accurately calculate the position of the stylus on a touch sensor panel.

SUMMARY OF THE DISCLOSURE

A stylus can be used as an input device for some capacitive touch panels. In some examples, the touch sensor panel can have errors in position detection, referred to herein as wobble error, when a stylus is positioned between two of a plurality of touch sensors. In some cases, wobble error can correlate to the signal profile associated with touch sensors within the touch sensor panel. Specifically, narrower (i.e., less linear) signal profiles are correlated with higher wobble error, and wider (i.e., more linear) signal profiles are correlated with lower wobble error. Accordingly, in some examples, touch sensors can be configured such that the signal profile associated with each touch sensor is spread to be wider, and thus, more linear. In some configurations, touch sensors can include projections (e.g., branches) which can interleave with projections of adjacent sensors. In some examples, projections of sensors can interleave in one dimension; in some examples, projections can interleave in two dimensions. In some examples, the lengths and widths of each projection can be selected based on a desired signal profile for each touch sensor. In some examples, each adjacent touch sensor can have substantially the same signal profile, and the signal profile can be linear enough to reduce wobble error.

BRIEF DESCRIPTION OF THE DRAWINGS

FIGS. 5A-5B illustrate exemplary interleaving sensors interleaving in one dimension according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

A stylus can be used as an input device for some capacitive touch panels. In some examples, the touch sensor panel can have errors in position detection, referred to herein as wobble error, when a stylus is positioned between two of a plurality of touch sensors. In some cases, wobble error can correlate to the signal profile associated with touch sensors within the touch sensor panel. Specifically, narrower (i.e., less linear) signal profiles are correlated with higher wobble error, and wider (i.e., more linear) signal profiles are correlated with lower wobble error. Accordingly, in some examples, touch sensors can be configured such that the signal profile associated with each touch sensor is spread to be wider, and thus, more linear. In some configurations, touch sensors can include projections (e.g., branches) which can interleave with projections of adjacent sensors. In some examples, projections of sensors can interleave in one dimension, in some examples, projections can interleave in two dimensions. In some examples, the lengths and widths of each projection can be selected based on a desired signal profile for each touch sensor. In some examples, each adjacent touch sensor can have substantially the same signal profile, and the signal profile can be linear enough to reduce wobble error.

Figure 1:
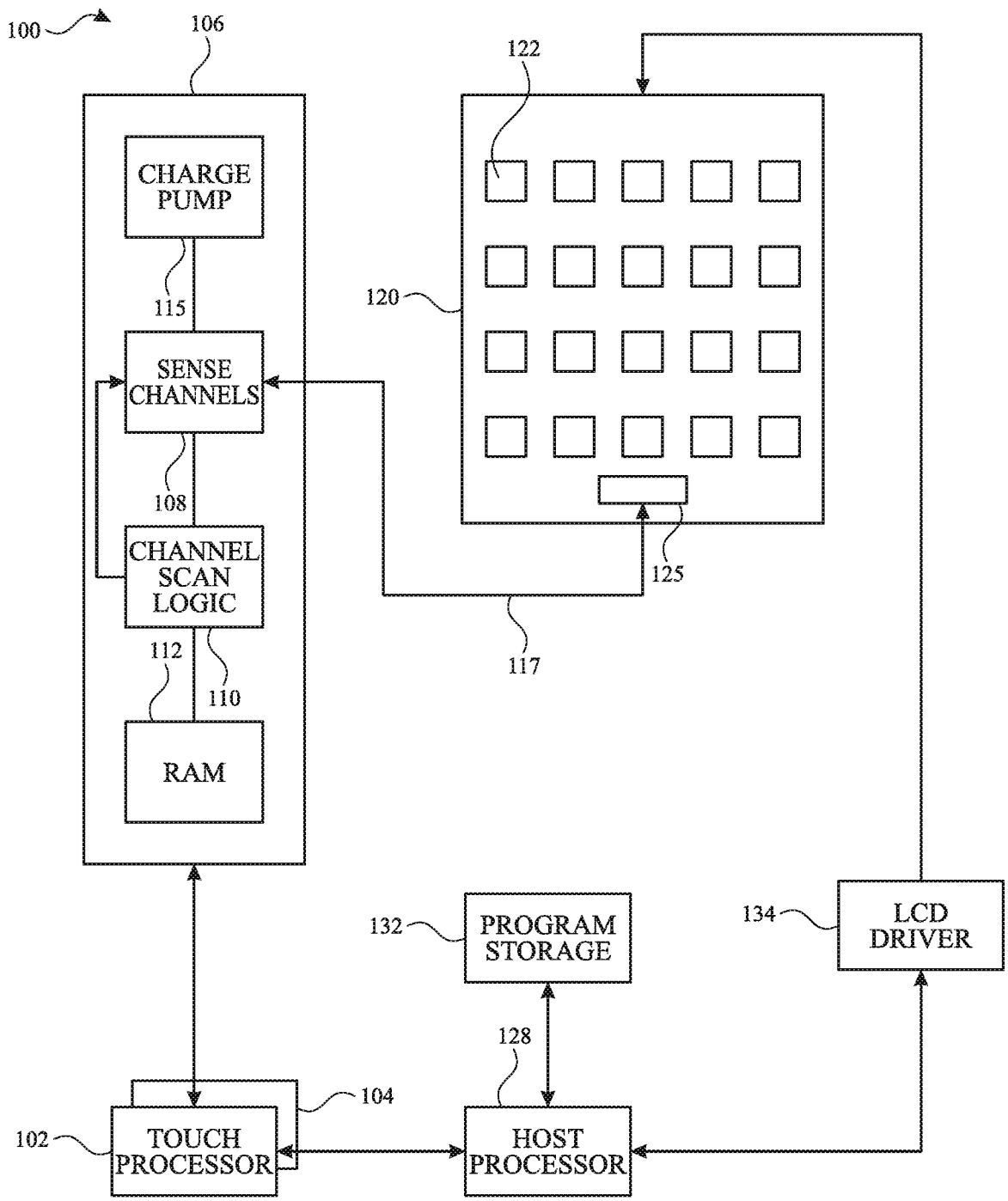
FIG. 1 illustrates an exemplary computing system capable of reducing wobble error according to examples of the disclosure.

FIG. 1 is a block diagram of an example computing system 100 that illustrates one implementation of an example touch sensor panel 120 according to examples of the disclosure. Computing system 100 can be included in, for example, mobile telephone, digital media player, portable computing device, or any mobile or non-mobile computing device that includes a touch sensor panel, including a wearable device. Computing system 100 can include a touch sensing system including one or more touch processors 102, peripherals 104, a touch controller 106, and touch sensing circuitry. Peripherals 104 can include, but are not limited to, random access memory (RAM) or other types of memory or storage, watchdog timers and the like. Touch controller 106 can include, but is not limited to, one or more sense channels 108 and channel scan logic 110. Channel scan logic 110 can access RAM 112, autonomously read data from sense channels 108 and provide control for the sense channels. In addition, channel scan logic 110 can control sense channels 108 to generate stimulation signals at various frequencies and phases that can be selectively applied to the touch pixels of touch sensor panel 120. In some examples, touch controller 106, touch processor 102 and peripherals 104 can be integrated into a single application specific integrated circuit (ASIC), and in some examples can be integrated with touch sensor panel 120 itself.

Touch sensor panel 120 can be a self-capacitance touch sensor panel, and can include touch a capacitive sensing medium having a plurality of touch sensors. In some examples, touch sensor panel 120 can be part of a touch screen. In some examples, the plurality of touch sensors can include a matrix of small plates of conductive material that can be referred to as touch pixels 122 or touch sensors. For example, touch sensor panel 120 can include a plurality of touch pixels 122, each touch pixel corresponding to a particular location on the touch sensor panel at which touch or proximity (i.e., a touch or proximity event) can be sensed. A touch sensor panel using touch pixels 122 can be referred to as a pixelated self-capacitance touch sensor panel. During operation, a touch pixel can be stimulated and the self-capacitance of the touch pixel with respect to ground can be measured. As an object approaches the touch pixel, the self-capacitance of the touch pixel can change. This change in the self-capacitance of the touch pixel can be detected and measured by the touch sensing system to determine the positions of one or more objects touching or proximate to the touch sensor panel. In some examples, the object can be an active stylus, and the self-capacitance of the touch pixel can change in response to a coupling between the touch sensor and the active stylus. Touch pixels 122 can be formed as a matrix of substantially transparent conductive plates made of materials such as Indium Tin Oxide (ITO) or Antimony Tin Oxide (ATO), although other transparent and non-transparent materials such as copper can also be used. Some touch sensor panels can be formed by partially integrating touch sensing circuitry and touch pixels into a display pixel stack-up (i.e., the stacked material layers forming the display pixels).

It is understood that while touch sensor panel 120 is described herein as including touch pixels electrodes 122 (e.g., touch sensors), the touch sensor panel can additionally or alternatively include rows and columns of conductive material. The operation of a touch sensor panel using row and column electrodes can be similar to that of a touch sensor panel using touch pixel electrodes. Additionally, it is understood that in some examples, touch sensor panel 120 can also be configured as a mutual capacitance touch sensor panel, though the description that follows will assume that the touch sensor panel is a self-capacitance touch sensor panel having a plurality of touch pixel electrodes.

Computing system 100 can also include host processor 128 for receiving outputs from touch processor 102 and performing actions based on the outputs. For example, host processor 128 can be connected to program storage 132 and a display controller, such as an LCD driver 134. The LCD driver 134 can provide voltages on select (gate) lines to each pixel transistor and can provide data signals along data lines to these same transistors to control the pixel display image as described in more detail below. Host processor 128 can use LCD driver 134 to generate an image on a display, such as a touch sensor panel. The image can be, for example, an image of a user interface (UI), and can use touch processor 102 and touch controller 106 to detect a touch on or near touch sensor panel 120.

The touch input can be used by computer programs stored in program storage 132 to perform actions that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can execute software or firmware implementing the algorithm for coded integration of a self-capacitance array according to examples of the disclosure. Host processor 128 can also perform additional functions that may not be related to touch processing.

Note that one or more of the functions described above, including the configuration of switches, can be performed by firmware stored in memory (e.g., one of the peripherals 104 in FIG. 1) and executed by touch processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2:
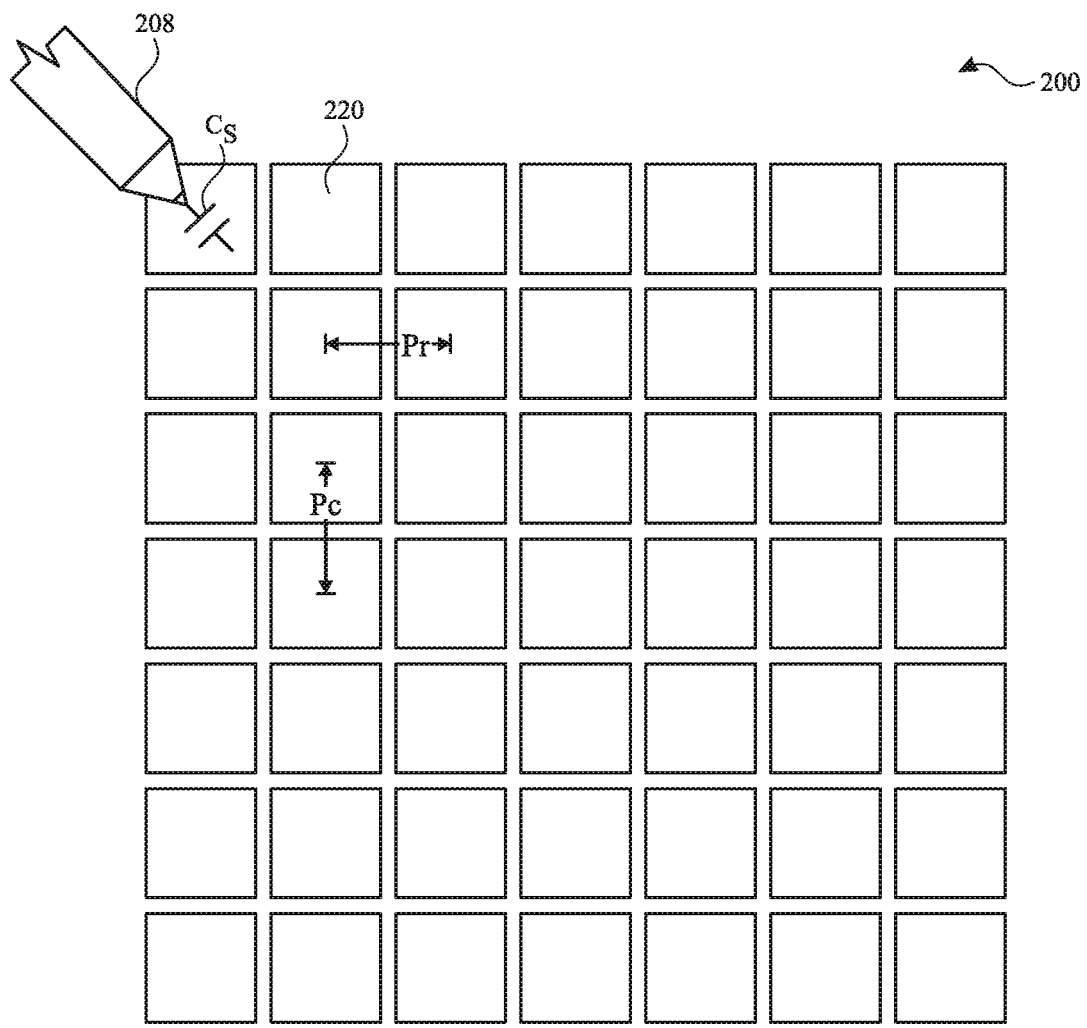
FIG. 2 illustrates an exemplary self capacitance touch sensor panel that can be used to detect touch or hover (proximity) events according to examples of the disclosure.

FIG. 2 symbolically illustrates an exemplary self capacitance touch sensor panel 200 that can be used to detect touch or hover (proximity) events with a stylus 208 according to examples of the disclosure. In some self capacitance examples, touch sensor panel 200 can include a plurality of touch sensors 220 forming touch nodes. In some examples each touch sensor can be electrically isolated from the other touch sensors and configured to represent a particular X-Y location (e.g., touch sensor 220) on the panel. Such touch sensor panels can be referred to as a pixelated self-capacitance touch sensor panels. A stylus 208 can include an electrode configured to capacitively couple to a touch sensor with a capacitance Cs. In some examples, the stylus can be an active stylus, and the self-capacitance of the touch pixel can change in response to a coupling between the touch sensor and the active stylus. Each of the touch sensors can output its capacitance readings to one or more touch sensing circuits (e.g., sense channels 108), which can be used to detect a touch or hover event. In other examples, the touch sensors can be configured as elongated sense rows and/or sense columns.

The distance between each adjacent touch node (e.g., the distance from midpoint of one sensor to the midpoint of an adjacent sensor) in the same row can be a fixed distance, which can be referred to as the row pitch Pr for row sensors. The distance between each adjacent touch node in the same column can have a fixed distance, which can be referred to as the column pitch Pc for column electrodes. In some examples, the pitch for row sensors and column sensors can be the same, but in other examples, Pr and Pc can be different.

Other touch sensor panel configurations, such as those with drive and sense lines and configured to operate as mutual-capacitance touch sensor panels, are also contemplated for use with examples of the disclosure. In some mutual capacitance examples, an active stylus can generate stimulation signals (effectively operating as a drive electrode), and column electrodes and row electrodes can effectively operate as touch sensors. During a stylus scan, one or more stimulation signals can be injected by stylus 208 into the touch sensor panel 200 and can cause mutual capacitive coupling between the stylus 208 and the row traces and capacitive coupling between the stylus 208 and the column traces. The capacitance Cmr and Cmc can be transmitted to one or more touch sensing circuits for processing. Additionally, in some examples, the touch sensor panel can include a stylus scan, a row scan, and a column scan, which can each operate as set forth above.

In some cases, an object, such as a stylus, may touch or hover at a position not directly over a touch node (e.g., a midpoint of touch sensor 220), but in between two touch nodes. For example, a stylus may touch or hover at a position between touch nodes (e.g., between touch sensors 220), or in the case of mutual capacitance, between two row electrodes, between two column electrodes, or both. In these examples, the signal sensed at a plurality of touch sensors 220 may be used to estimate the location of the touch or hover event. In some examples, a centroid estimation algorithm can calculate the location of the touch or hover event using the signal sensed at the plurality of touch sensors 220. For example, the position of a stylus on a touch sensor panel along an x-axis can be calculated by computing a weighted centroid defined in equation (1):

$$x_{calc} = \frac{\sum_{i=-N}^{N} x_i S_i}{\sum_{i=-N}^{N} S_i} \quad (1)$$

where $x_{calc}$ can be the calculated position along the x-axis, $S_i$ can be the signal measured at the $i^{th}$ sensor, such as a touch sensor, along the x-axis, and $x_i$ can be the position of the $i^{th}$ sensor along the x-axis. It is to be understood that the centroid estimation algorithm defined in equation (1) is given only as an example, and the configurations described herein need not be limited to such examples. Instead, the calculation of a touch or hover location of an object can be accomplished using any appropriate method.

Ideally, as an object such as a stylus traverses between two touch nodes, the calculated position of the stylus on the touch sensor panel and the actual position of the stylus should be the same. In reality, the calculated position may be different from the actual position due to limitations in the circuit configuration and the position estimation algorithms used. Errors resulting from the disparity between calculated position and actual position as an object moves along a touch sensor panel can be referred to as wobble error.

Figure 3A:
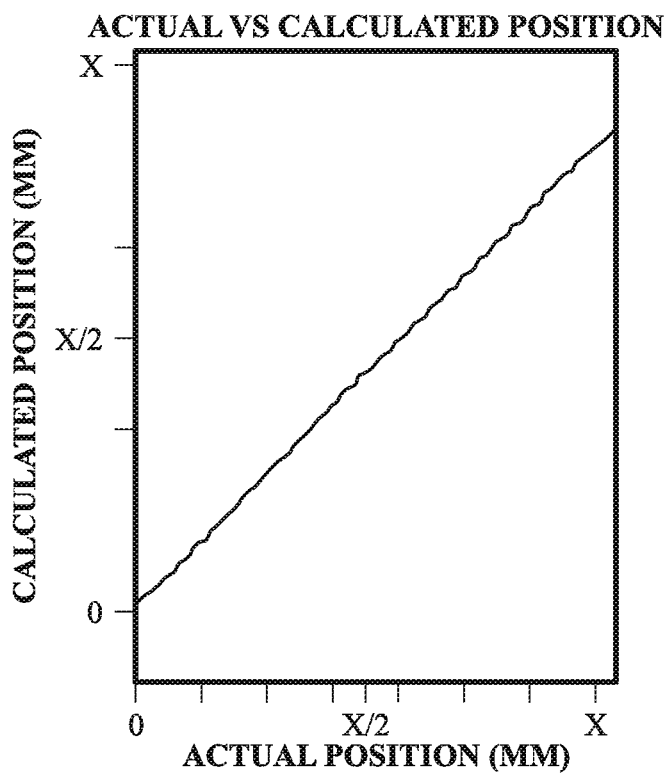
FIGS. 3A-3B illustrate examples of the disparity between actual position and calculated position (wobble error) as a stylus moves along one axis of a touch sensor panel according to examples of the disclosure.
Figure 3B:
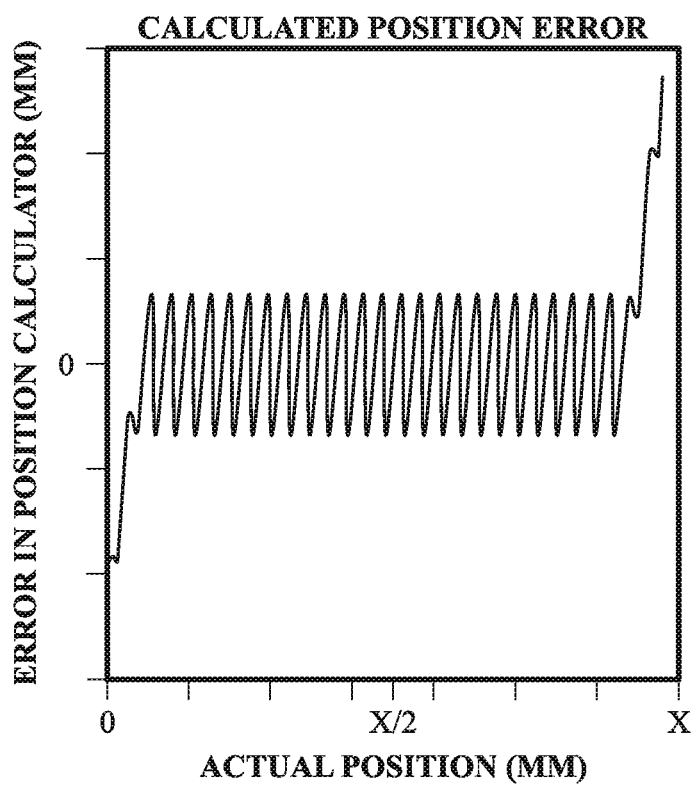

It can be useful to consider wobble error in the context of a stylus moving along a single axis of a touch sensor panel with square sensors (e.g., sensors without interleaving projections). This concept is illustrated by example in FIGS. 3A-3B. FIGS. 3A-3B illustrate examples of the disparity between actual position and calculated position as an object, such as a stylus, moves along an x-axis of a customary touch sensor panel (e.g., a touch panel without interleaving sensors) according to examples of the disclosure. FIG. 3A illustrates a plot of the calculated position of the stylus versus the actual position of the stylus when calculating position using a weighted centroid algorithm including a subset of the sensors (e.g., five sensors) along an x-axis. In an ideal case, where calculated position and actual position are the same, the plot can be a straight line at a 45 degree angle. However, because of non-idealities in the coupling between the stylus and the touch sensor panel and the algorithm used to calculate stylus position, there can be non-ideal results that can appear as a wobble in the plot of FIG. 3A as the stylus moves between sensors along the x-axis. In other words, the signal coupling between the stylus and touch sensor panel and the calculated position metric can introduce an error in calculated position (discrepancy with actual position) that can cause a wobble to be displayed when plotting the actual versus calculated position.

FIG. 3B illustrates a plot of the error in position calculation versus the actual position when calculating position by taking a weighted centroid including a subset of the sensors (e.g., five sensors) along an x-axis. The oscillation of the error plot can be representative of the wobble due to remaining error in the position calculation in a conventional touch sensor panel (e.g., a touch sensor panel having square sensors without projections). Although FIGS. 3A-3B are described with reference to the x-axis, in some examples, similar effects can be observed when moving the stylus across the touch sensor panel along the y-axis.

It should be noted that the scope of this disclosure can extend beyond the context of an active stylus coupling to touch sensors; however, the examples of this disclosure focus on a stylus-touch sensor configuration for ease of description. FIGS. 3A-3B relate to calculating position using a subset of the sensors; however, it should be understood that the position could be calculated using any number of sensors, including all of the sensors in a touch sensor panel. It should also be understood that the plots in FIG. 4B are presented only as examples and should not be understood to represent precise values or scale.

Figure 4A:
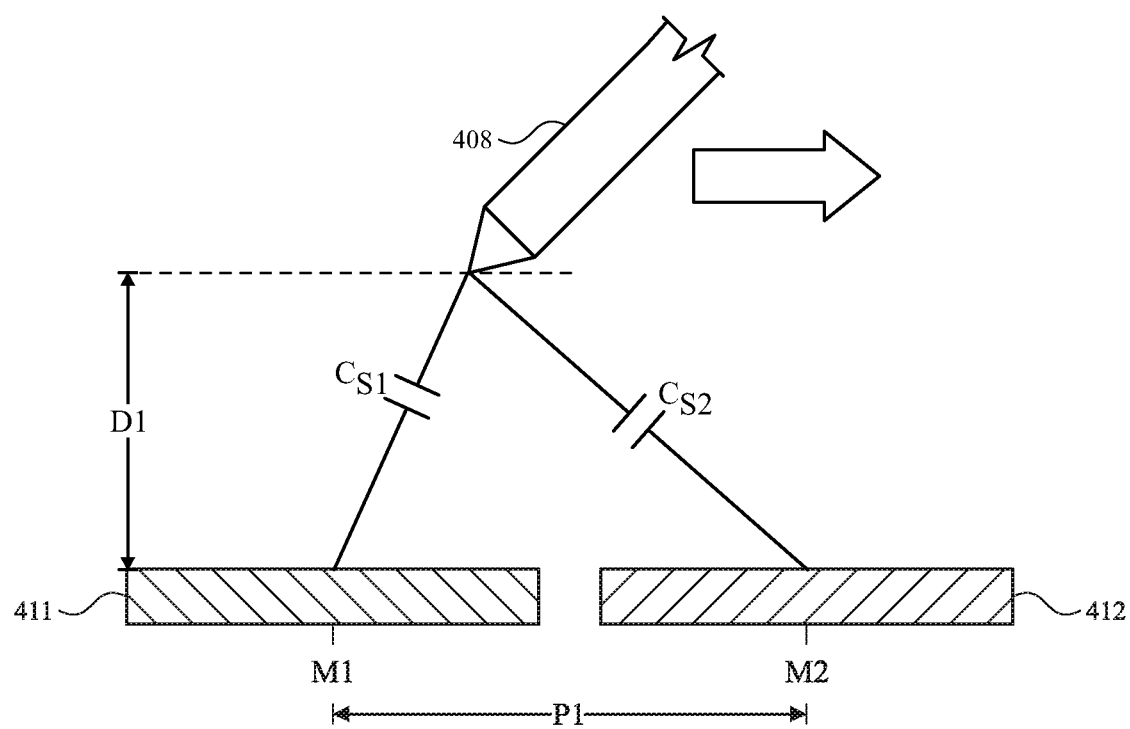
FIGS. 4A-4C illustrate example signal profiles as a stylus moves along an axis of a touch sensor panel and corresponding levels of wobble error according to examples of the disclosure.

It can be useful to discuss the characteristics of the touch sensor configuration of a touch sensor panel in terms of the signal profile between a stylus and a touch sensor and the resulting wobble error. This concept is explained by example with reference to FIGS. 4A-4C. FIGS. 4A-4B relate to example signal profiles in an x-axis of two hypothetical touch sensors 411 and 412 having a pitch P1. FIG. 4B illustrates signal profiles of sensors in two hypothetical configurations: a first configuration (plots 443 and 444 shown in solid line) wherein the signal profile is relatively non-linear, and a second configuration (plots 441 and 442 shown in dotted line) wherein the signal profile is relatively linear. The first and second configurations can differ, for example, in sensor shape or orientation.

As shown in FIG. 4A, an object, such as a stylus 408, can be at a distance D1 above a touch sensor 411 and moved in an x-direction across touch sensor 411 and 412. At each point along the x-axis, a signal coupling Cs exists between the stylus and the touch sensor 411 and between the stylus and touch sensor 412, which varies as the stylus moves across touch sensors 411 and 412. FIG. 4B illustrates a plot of example signal profiles, which can correlate to the signal Cs1 sensed on touch sensor 411 and signal Cs2 sensed on touch sensor 412 from stylus 408 as the stylus is moved in the x-direction. In some examples, such as when the stylus 408 is an active stylus, the signal Cs may represent a signal transduced by the stylus on the touch sensor. In some examples, the signal Cs may correspond to a self-capacitance of an object detected by the touch sensor or a change in mutual capacitance between a drive touch sensor and sense touch sensor. The x-axis of the plot in FIG. 4B can correlate to the position of the stylus in the x-axis relative to midpoints M1 and M2 of touch sensors 411 and 412, and the y-axis of the plot in FIG. 4B can correlate to a normalized signal measurement at each x-position along the x-axis.

Figure 4B:
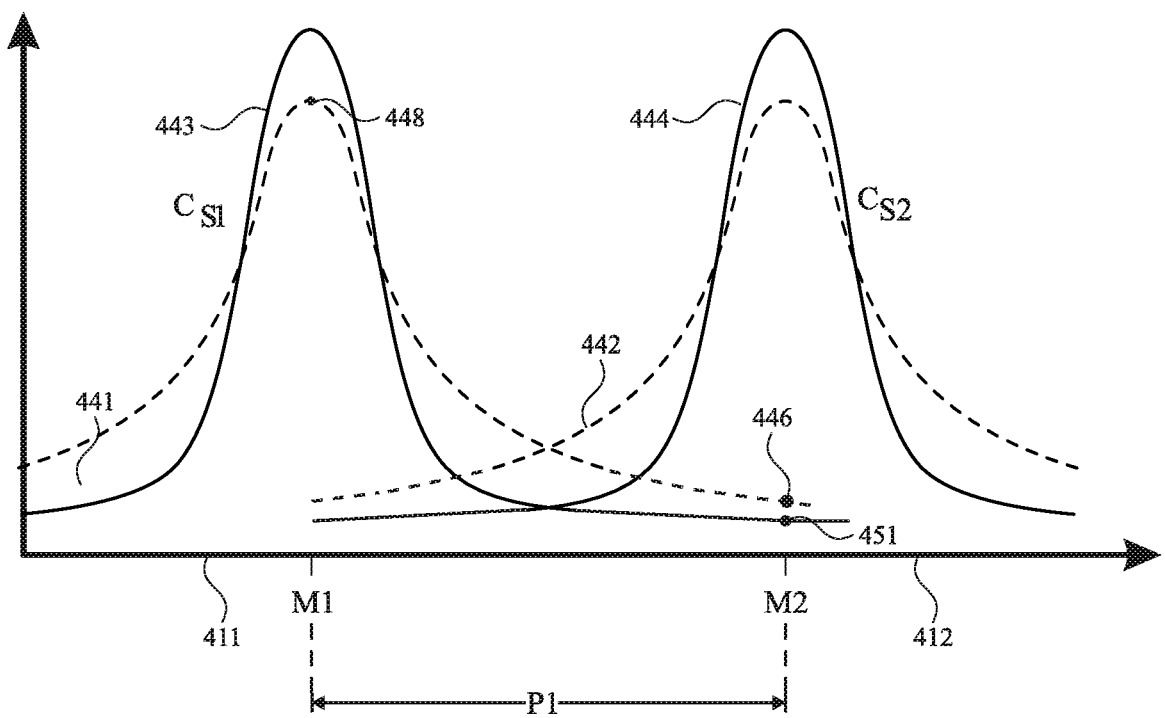

Looking first at the relatively non-linear plots 443 and 444, as shown in FIGS. 4A-4B, the signal profile 443 for touch sensor 411 can have a maximum value when the stylus is at the midpoint M1 of touch sensor 411, and the signal level can decrease non-linearly as the stylus traverses the x-axis away from the midpoint M1. When the stylus is over a midpoint M2 of adjacent touch sensor 412, only a small amount of signal can be detected at touch sensor 411, as shown at point 451. Looking now at the more linear example plots 441 and 442, touch sensor 411 can have a maximum signal Cs1 level 441 when stylus is at the midpoint M1 of touch sensor 411, and the signal level can decrease somewhat linearly as the stylus traverses the x-axis away from the midpoint M1. When the stylus is over a midpoint M2 of adjacent touch sensor 412, more signal Cs1 can be detected by touch sensor 411, as shown at point 446.

Figure 4C:
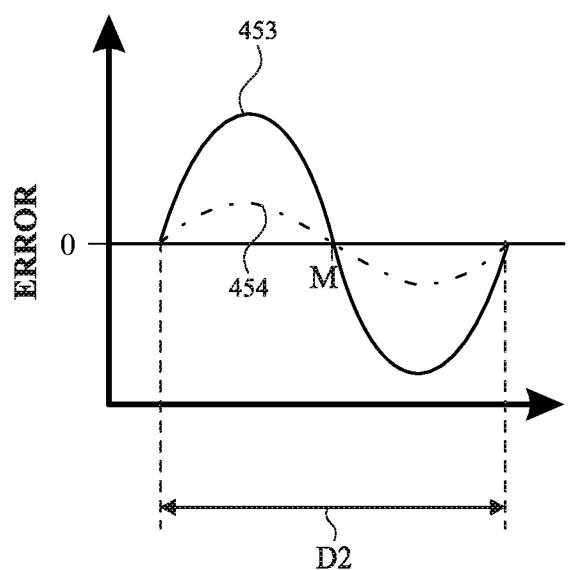

FIG. 4C illustrates two example plots of the error in position calculation versus the actual position (i.e., wobble error) when calculating position of a stylus by taking a weighted centroid including a set of touch sensors along an x-axis. Each error plot 453 and 454 corresponds to a set of touch sensors with touch sensor configurations corresponding to plots 443-444 and 441-442, respectively. FIG. 4C is similar to the plot of FIG. 3B, however, unlike the plot in FIG. 3B, which has an x-axis spanning the length of the touch sensor panel, the x-axis of FIG. 4C spans only the distance D2 (e.g., the distance of the pitch) immediately surrounding a single touch sensor as shown. In some examples, the single oscillation in the error plots 453 and 454 shown in FIG. 4C can be similar to one of the many oscillations shown in FIG. 3B. For clarity, each of the example touch sensor configurations represented in FIGS. 4A-4C are assumed to have an equal pitch and midpoint.

If a signal profile is very non-linear, position estimation algorithms, such as that listed in equation (1), can produce higher wobble error when a stylus is positioned between touch nodes. As shown in FIG. 4C, error plot 453 corresponding to the first touch sensor configuration (i.e., the less linear signal profile configuration) has more wobble error than error plot 454. Likewise, error plot 454 corresponding to the second touch sensor configuration (i.e., the more linear signal profile configuration) has relatively little wobble error as compared to error plot 453 corresponding to the first touch sensor configuration. Thus, as illustrated in these examples, touch sensor configurations with more linear signal profiles can correlate with lower wobble error.

The configurations and plots represented in FIGS. 4B and 4C are presented only as examples of how a more linear signal profile can be correlated with lower wobble error, and should not be understood to represent specific values or scale. It should be understood that wobble error of a touch sensor panel can be determined by other factors in addition to configuration of the touch sensors in the touch sensor panel, such as, for example, position calculation algorithms used, stylus shape, and touch sensor pitch. Moreover, the solutions discussed in this disclosure can apply to configurations different from those discussed with respect to FIGS. 4A-4C, including configurations of mutual capacitance, self-capacitance, and configurations wherein the touch object is not a stylus.

As discussed above, touch sensors having a more linear signal profile can correlate to a lower wobble error. Therefore, it can be beneficial to configure each touch sensor in a touch sensor panel to have a more linear signal profile, by, for example, spreading the signal profile associated with each sensor outwardly toward adjacent touch sensors. Thus, in some examples, it can be beneficial to utilize interleaving sensors, that is, sensors with interleaving projections. These interleaving sensors will now be discussed below with reference to FIGS. 5A-5B and 6A-6B.

FIGS. 5A-5B illustrate exemplary interleaving sensors having projections interleaving in one dimension, referred to hereinafter as one-dimensional interleaving sensors. At left is a first sensor, referred to hereinafter as a left sensor 510; at right is a second sensor, referred to hereinafter as a right sensor 530. It should be noted that, although these sensors are referred to as "left" and "right" sensors for convenience of explanation, left and right sensors 510 and 530 need not be in any particular order.

In some cases, it can be useful to discuss the elements of interleaving sensors in the context of a hypothetical square sensor without projections (e.g., the sensors in the configuration shown in FIG. 2), which can act as a baseline reference point in determining sensor parameters. In some cases, the hypothetical square sensor can have a row pitch $Pr_{SQUARE}$, column pitch $Pc_{SQUARE}$, width $W_{SQUARE}$, and height $H_{SQUARE}$. For example, in some cases the row and column pitch of the sensors (shown in FIG. 2 as Pr and Pc, respectively) can be selected using simple square sensors. Then, by using a square sensor as a reference, projections can be added while retaining the chosen column pitch and row pitch, as will be discussed below. This approach can be convenient if design constraints of a touch sensor panel require a certain pitch. In addition, in some cases, a desired surface area can be chosen for the square sensor. Then, using the square sensor as a reference, sensors with interleaving projections can be designed to have the same surface area. Although a hypothetical square sensor can be a convenient reference point, it should be understood that the example sensors disclosed herein are not dependent on a square sensor (hypothetical or otherwise) during operation or during the design process. Moreover, in other examples, other shapes, including non-rectangular shapes, may operate as baseline reference points.

For convenience of explanation, the hypothetical borders of a square sensor (e.g., a hypothetical sensor without projections) are represented with dashed lines in FIG. 5A, the square sensor borders having a width $W_{SQUARE}$ and height $H_{SQUARE}$. The row pitch $Pr_{SQUARE}$ is also represented in FIG. 5B with dashed lines. As shown in FIG. 5A, both the left and right sensors 510 and 530 can include one or more projections extending outwardly beyond the hypothetical square sensor borders in a single direction (e.g., an x-direction). In addition, both left and right sensors 510 and 530 can include one or more recesses receding inwardly from the square sensor borders in the single direction (e.g., an x-direction). For convenience, the lengths of these projections and recesses are given in terms of the length extending past the square sensor borders (in the case of projections) or the length receding into the square sensor borders (in the case of recesses). In some examples, each projection 511-512 in the left sensor 510 can correspond to a recess 535-536 in the right sensor 530. Likewise, each projection 531-534 in the right sensor 530 can correspond to a recess 513-516 in the left sensor 510. In other words, dimensions of projections in the left sensor 510 can substantially match the dimensions of recesses in the right sensor 530.

It can be helpful to conceptualize sensors with interleaving projections (e.g., interleaving sensors) as each having the shape of a square sensor, but with certain areas "moved" from one sensor to another. For example, projections 511 and 512 of left sensor 510 can be conceptualized as being moved from within the square sensor borders of right sensor 530 to outside of the square sensor borders of left sensor 510, leaving recesses 535 and 536. In some cases, small areas of sensor material (e.g., areas 517 and 537) remain within the square sensor borders in order to connect the projections to the rest of the sensor, which can likewise correspond to missing areas (e.g., areas 518 and 538). As indicated above, although dimensions are described herein with reference to a hypothetical square sensor, the sensors disclosed herein need not be described with reference to a square sensor, and need not consider a square sensor in the design process.

The projections in the interleaving touch sensors have the effect of spreading the sensor area outwardly toward adjacent sensors. As will be discussed with reference to FIGS. 8A-8B, this can have the effect of spreading the signal profile associated with the interleaving touch sensors. In some examples, touch sensors can be symmetric about one or two axes. In some examples, projections and areas of the touch sensor can form a "T" shape. For example, projection 511 in left sensor 510 can be visualized as forming a T when combined with sensor area 517. In some examples, other projections and areas of the touch sensor can form an "L" shape. For example, projection 531 in right sensor 530 can be visualized as forming an L when combined with sensor area 537. In some cases, two L-shaped areas can interdigitate with one T-shaped area, as illustrated in FIG. 6B.

The differences and similarities between left sensor 510 and right sensor 530 will now be discussed. In some cases, the left and right sensors can be different in form. In other words, the left and right sensors can differ in either shape or orientation. For example, left sensor 510 and right sensor 530 are different forms, as they differ in shape. In some cases, as in the sensors shown in FIG. 5A, the length L1 of the projections in the left sensor 510 can match the lengths L1 of the projections in the right sensor 530, although in other examples, projection lengths may differ between sensors. In some configurations, the surface area of each projection within a sensor can be equal. For example, each of the projections 511-512 of left sensor 510 can all have a surface area defined by a length L1 and a width W1, and each of the projections 531-534 of right sensor 530 can have a surface area defined by a length L1 and a width W2. Additionally, in some examples of one-dimensional interleaving sensors, the individual surface area of each projection in the left sensor can be different from the surface area of each projection in the right sensor. For example, the surface area of each projection 511-512 in left sensor 510 (as defined above) is different than the surface area of each projection 531-534 in right sensor 530 (as defined above). However, despite the differences in individual surface area of projections, the total surface area of left sensor 510 can equal the total surface area of right sensor 530.

In some examples, the projections 511-512 of the left sensor 510 can interleave with the projections 531-534 such that left sensor 510 and right sensor 530 are interdigitated, as shown in FIG. 5B. Returning again to the concept of a hypothetical square sensor, in cases where each sensor is symmetric in the first dimension about the center, the row pitch between the left and right sensors 510 and 530, $Pr_1$ can match the square sensor pitch $Pr_{SQUARE}$ (e.g., the pitch of a hypothetical square sensor without projections). As shown, projections of the left sensor 510 can be interdigitated with projections of the right sensor 530. Although only two touch sensors are shown for clarity, the left and right sensors 510 and 530 can be patterned in an alternating one-dimensional array across the length of a touch sensor panel. In some cases, left and right sensors can be patterned in a two-dimensional array with sensor projections interleaving in only one dimension. A detailed explanation of the dimensions of one-dimensional interleaving sensors will be given later, but it should be noted here that the sensors illustrated in FIGS. 5A-5B are exemplary only. Other sensors with one-dimensional interleaving within the scope of this disclosure may include more or less projections, each of which may have different dimensions and surface areas.

The details of the dimensions and operation of one-dimensional interleaving sensors will now be discussed. In general, it can be important that the attributes of one-dimensional interleaving sensors are selected such that the signal profile associated with the left sensor and the signal profile associated with the right sensor share substantial symmetry, that is, the signal profile of each sensor is substantially the same. Moreover, in some examples, it can be important that the attributes of the one-dimensional interleaving sensors are selected as to achieve a desired signal profile (e.g., a more linear signal profile).

It can be important to the operation of the touch sensor panel that the left and right sensors in a one-dimensional interleaving configuration have substantially the same signal profile in the first dimension. In cases where the left and right sensors have different forms, attributes of the touch sensors may need to be selected such that, despite the different form, the two sensors have substantially the same signal profile. In this example, this can be achieved by setting each projection to be equal in length, L1, and likewise setting each recess to be substantially equal to L1 (e.g., recess areas 513-516 and 535-536 have a length L1). In some examples, signal profiles corresponding to adjacent electrodes can be acceptably similar when the signal at any point along the x-axis of the first signal profile varies by less than 27% from any corresponding point along the x-axis of the second signal profile.

As discussed above, the linearity of a signal profile between a stylus and sensor can correlate with the amount of wobble error in the touch sensor panel, and the parameters of a sensor can determine the signal profile associated with the sensor. Specifically, signal profiles that are wider, and thus more linear, can correlate to lower wobble error. In some interleaving sensors, the length of the projections (e.g., L1) can determine the amount of spread in the signal profile (e.g., a larger projection length L1 can result in a larger spread). Therefore, in some cases, the parameters of interleaving sensors (e.g., the length L1 of projections in sensors 510 and 530) can be selected such that the signal profiles associated with each of the sensors are spread outward as to be more linear.

In can be useful to consider the spread of a signal profile based on what percentage of the maximum signal amplitude is detected at the midpoint of an adjacent sensor (e.g., the amplitude at point 446 in FIG. 4B). In some cases, a signal profile can correlate to less wobble error when the signal profile at the adjacent sensor is 12-30% of the maximum signal amplitude. In some cases, even less wobble error can correlate to a signal profile with 15-20% of the maximum amplitude detected at the adjacent sensor. In some examples, an ideal signal profile is produced for sensors having a row pitch of 4 mm when the projection length of each sensor (e.g., length L1 in FIG. 5A) is equal to 0.7 mm, or 17.5% of the row pitch. It should be understood that these values are exemplary only, and acceptable signal profiles in other configurations may correspond to other values. Moreover, although the linearity of signal profiles can reduce wobble error, increasing the linearity of signal profiles can simultaneously reduce the maximum signal detected at each touch sensor, thus, potentially decreasing the signal-to-noise ratio (SNR) of the touch sensor panel. Therefore the desired signal profile may also depend on the design goals and attributes of the touch sensor panel.

Figure 6A:
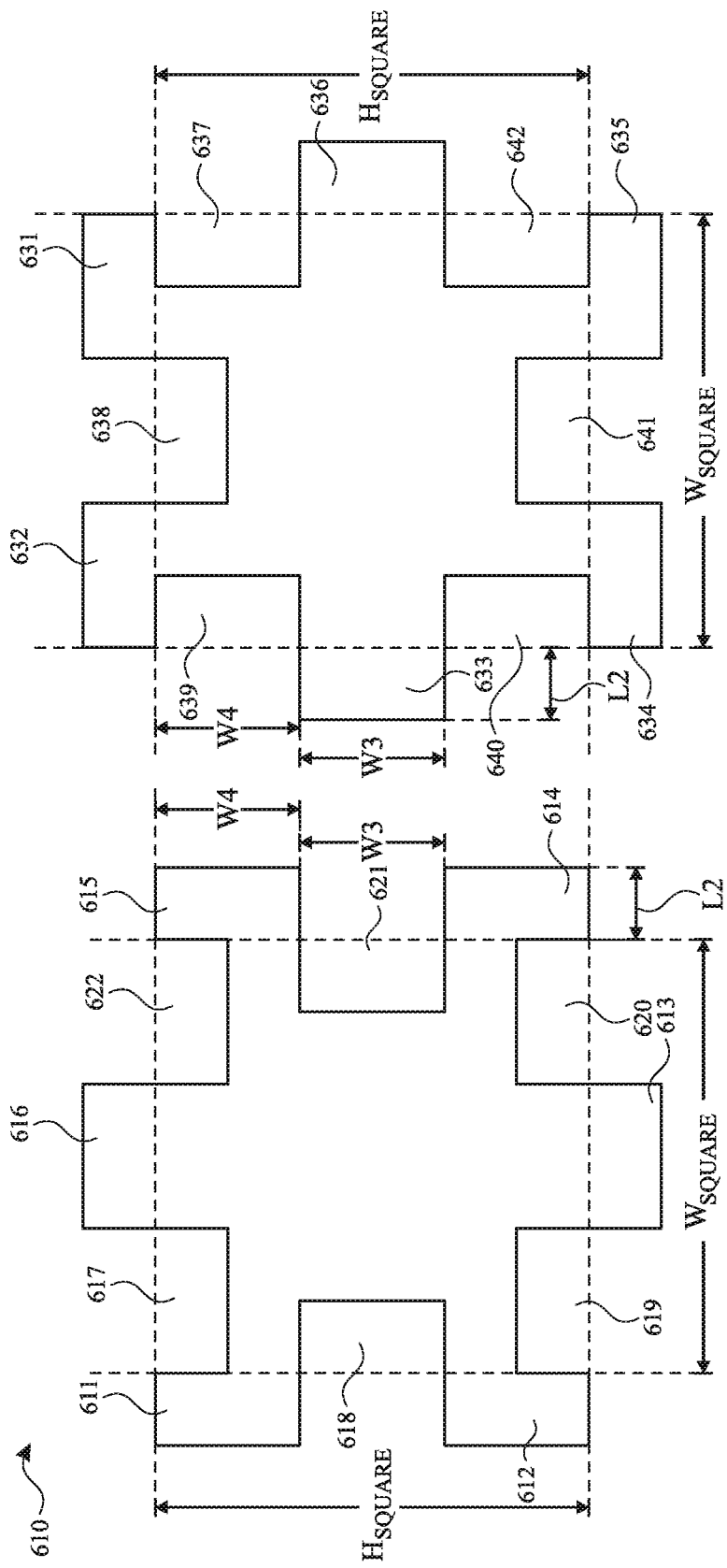
FIGS. 6A-6B illustrate exemplary interleaving sensors interleaving in two dimensions according to examples of the disclosure.
Figure 6B:
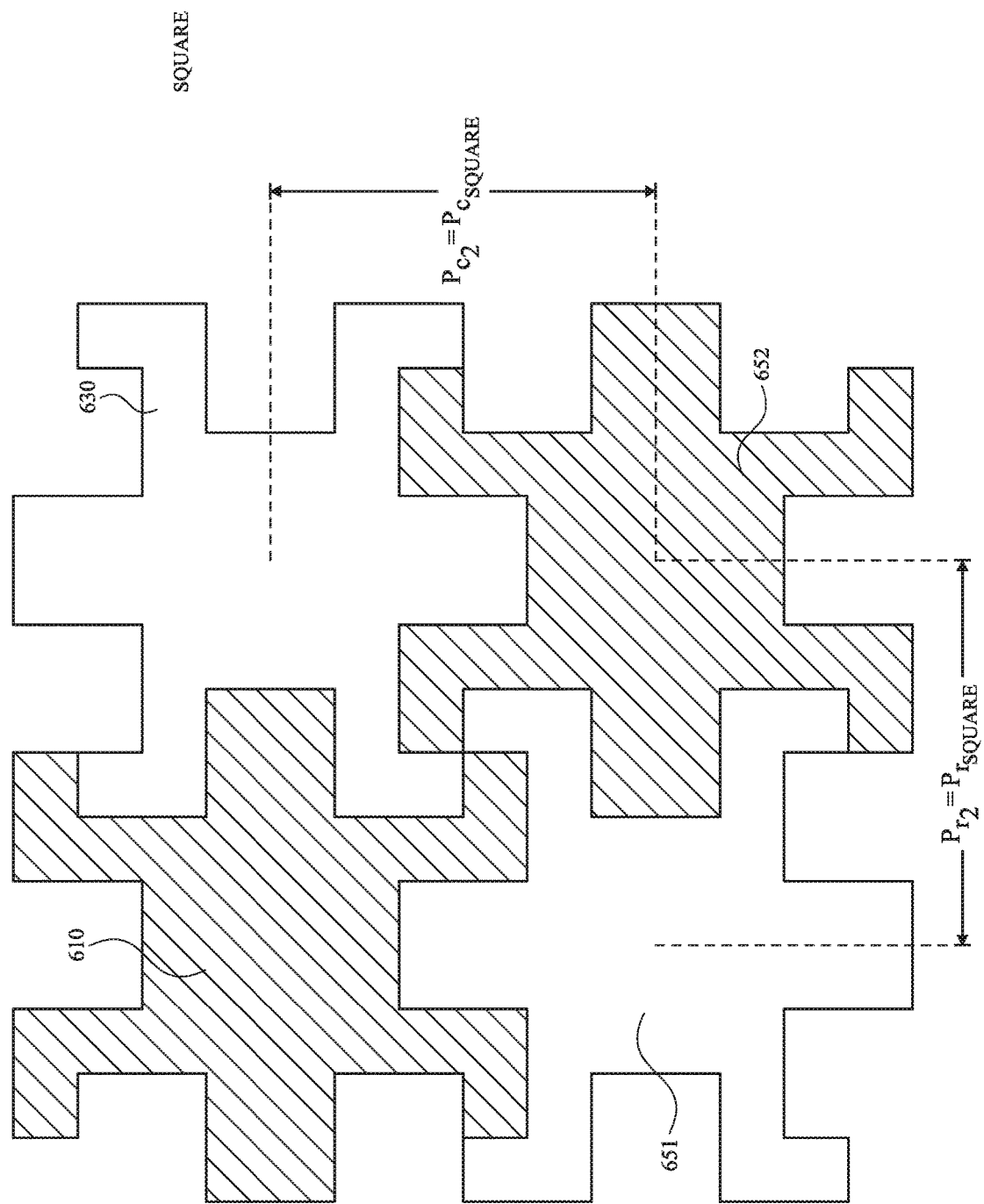

FIGS. 6A-6B illustrate exemplary interleaving sensors having projections that interleave in two dimensions according to examples of the disclosure. FIGS. 6A-6B illustrate two-dimensional interleaving sensors, including a left sensor 610 and right sensor 630. It is understood that the terms "left" and "right" are for convenience only, and left and right sensors 610 and 630 need not be in any particular order. As shown in FIG. 6A, left sensor 610 and right sensor 630 can each have a different form (i.e., a different shape or orientation). Specifically, in this example, right sensor 630 is the same shape as left sensor 610, but is rotated 90 degrees with respect to the orientation of the left sensor 610.

As with the one-dimensional interleaving sensors, it can be helpful to describe the projections of the two-dimensional interleaving sensors with reference to a hypothetical square sensor (e.g., a sensor without projections). For convenience of explanation, borders of a hypothetical square sensor are shown with dashed lines in FIG. 6A, along with a height $H_{SQUARE}$ and width $W_{SQUARE}$. In addition, a row pitch $Pr_{SQUARE}$ and a column pitch $Pc_{SQUARE}$ are shown with dashed lines in FIG. 6B. As shown in FIG. 6A, both the left and right sensors 610 and 630 can include one or more projections extending outwardly beyond the square sensor borders in a two directions (e.g., some in the x-direction and some in the y-direction). In addition, both left and right sensors 610 and 630 can include one or more recesses receding from the square sensor borders in a two directions. For convenience, the length of each projection or recess is described with reference to the border of a hypothetical square sensor. For example, the length of a projection can refer to the distance extended outwardly past the square sensor border; likewise, the length of a recess can refer to the distance receding inwardly from the square sensor border. In some examples, each projection 611-616 in the left sensor 610 can correspond to a recess 637-642 in the right sensor 630. Likewise, each projection 631-636 in the right sensor 630 can correspond to a recess 617-622 in the left sensor 610. In other words, dimensions of projections in the left sensor 610 can substantially match the dimensions of recesses in the right sensor 630. As described with reference to FIG. 5A above, projections in each sensor can also be conceptualized as being area moved from within the square sensor borders of one sensor to outside of the square sensor borders of another sensor. For example, projections 614 and 615 of left sensor 610 can be conceptualized as being moved from within the square sensor borders of right sensor 630 to outside of the square sensor borders of left sensor 610, leaving recesses 639 and 640.

In some examples of two-dimensional interleaving sensors, the left sensor can have the same shape as the right sensor, but in an orientation different from the right sensor. For example, in FIG. 6A, left sensor 610 can have the same shape as right sensor 630, but be in an orientation orthogonal to the orientation of the right sensor 630. In some cases, the top and bottom sides of a sensor can each have an identical set of first projections and first recesses (e.g., projections and recesses 617, 616, and 622, identical to 619, 613, and 620), and left and right sides of a sensor can each have an identical set of second projections and second recesses, different from the set of first projections and first recesses (e.g., projections and recesses 611, 618, and 612, identical to 615, 621, and 614). In some examples, each of the first projections and each of the second recesses can have a first width, and each of the first recesses and each of the second projections can have a second width. For example, in left sensor 610, projections 611, 612, 614, 615 and recesses 617, 619, 620, and 622 can have a width W4, while projections 616 and 613 and recesses 618 and 621 can have a different width W3. In addition, elements with different widths can also have different surface areas. However, despite differences in the individual surface areas of some projections, generally, the left and right sensors can each have the same total surface area. For example, in FIG. 6A, both left sensor 610 and right sensor 630 have the same shape and dimensions, and thus, same surface area.

In some examples, the projections 611-616 of left sensor 610 can interleave with the projections 631-636 of the right sensor 630 such that left sensor 610 and right sensor 630 are interdigitated in two dimensions. FIG. 6B illustrates left sensor 610 interdigitated with right sensor 630 in a first direction. In addition, the right sensor 630 is interdigitated with a different left sensor 652 in a second direction, and the left sensor 610 is interdigitated with a different right sensor 651 in the second direction. Returning again to the concept of a hypothetical square sensor, in some cases, the two-dimensional interleaving sensors can have the same row pitch $Pr_2$ and column pitch $Pc_2$ as a square sensor pitches $Pr_{SQUARE}$ and $Pc_{SQUARE}$, as shown. Although only four sensors are shown for clarity, the left and right sensors 610, 630, 651, and 652 be patterned in an alternating two-dimensional array across the area of the touch sensor panel. A detailed explanation of the dimensions of two-dimensional interleaving sensors will be given later, but it should be noted here that the sensors illustrated in FIGS. 6A-6B are exemplary only. Other two-dimensional sensors with interleaving projections within the scope of this disclosure may include more or less projections, which may have different dimensions, surface areas, and shapes, including non-rectangular shapes. Moreover, in other examples, interleaving sensors may be arranged in a non-orthogonal array, such as an array in a honeycomb pattern. In these cases, projections may interleave on more sides than four.

The details of the dimensions and operation of two-dimensional interleaving sensors will now be discussed. In general, it can be important that the attributes of two-dimensional interleaving sensors are selected such that the signal profile in an x-direction is substantially the same for each sensor, and the signal profile in a y-direction is also substantially the same for each sensor. Moreover, in some examples, it can be important that the attributes of the two-dimensional interleaving sensors are selected as to achieve a desired signal profile (e.g., a more linear signal profile in both the x-direction and y-direction). In examples where projection interleaving is in two dimensions, there can be two or more parameters to tune (e.g., projection width, projection length, etc.) in order to achieve an acceptable signal profile, as will be explained in detail below.

It can be important to the operation of the touch sensor panel that the left and right sensors in a two-dimensional interleaving configuration each have substantially the same signal profile both in an x-direction and in a y-direction. In cases where the left sensor and right sensor are the same shape and orthogonally oriented, this condition can be satisfied when the left sensor and right sensor each have substantially the same signal profile in an x-direction (i.e., because the signal profile in the x-direction of the left sensor is the signal profile in the y-direction of the right sensor, and vice versa).

In some examples, the similarity of signal profiles between the left sensor and right sensor in a two-dimensional interleaving configuration can be a function of the ratio between the width of one or more projections and the pitch size of the sensors, or W:P. In this example, the column pitch of the sensors $Pc_2$ is equal to the row pitch $Pr_2$. Therefore, in this example, pitch P in the ratio W:P can represent either the column pitch or row pitch. In other examples, the width W can correspond to a width of a projection as measured in a first direction, and the pitch P can correspond to the pitch size in the first direction. Applying this function to the example sensors shown in FIG. 6A, the similarity of signal profiles between the left sensor and right sensor can depend on the ratio of width W4 to pitch size of the sensors. In the configuration shown in FIG. 6A, signal profiles associated with the left and right sensors 610 and 630 can be acceptably similar when the ratio of projection width W4 to pitch size P is between 0.35 and 0.375.

In some examples, to reduce wobble error in two-dimensions, the attributes of two-dimensional interleaving sensors can be selected as to achieve a desired signal profile (e.g., a more linear signal profile in both the x-direction and y-direction). As explained above with reference to FIGS. 3A-3B, signal profiles in an x-direction that are more linear can correlate with lower wobble error in the x-direction, and signal profiles in a y-direction that are more linear can correlate with lower wobble error in the y-direction. In examples where the signal profile in the x-direction substantially matches the signal profile in the y-direction, and each projection has a same length (e.g., L2), the spread of a signal profile can be a function of the length of the projections in relation to the pitch size of the sensor, or L2:P.

In the example shown in FIG. 6A, each projection has a length L2, as measured from the border of a hypothetical square sensor (e.g., a sensor without projections or recesses). Adjusting length L2 can, in some examples, change the spread of the signal profile associated with the left and right sensors 610 and 630. As with the one-dimensional interleaving sensors, it can be useful to consider the spread of a signal profile based on what percentage of the maximum signal amplitude is detected at the midpoint of an adjacent sensor (e.g., the amplitude at point 446 in FIG. 4B). As in the one-dimensional case, a signal profile can correlate to less wobble error when the signal profile at the adjacent sensor is 12-30% of the maximum signal amplitude. In some cases, even less wobble error can correlate to a signal profile with 15-20% of the maximum amplitude detected at the adjacent sensor.

In some examples, an acceptable signal profile is produced for sensors having a row pitch of 4 mm when the projection length of each sensor (e.g., length L2 in FIG. 6A) is equal to 1 mm, or 25% of the pitch size. It should be understood that these values are exemplary only, and acceptable signal profiles in other configurations may correspond to other values. Moreover, although the linearity of signal profiles can reduce wobble error, increasing the linearity of signal profiles can simultaneously reduce the maximum signal detected at each touch sensor, thus, potentially decreasing the signal-to-noise ratio (SNR) of the touch sensor panel. Therefore the desired signal profile may also depend on the design goals and attributes of the touch sensor panel.

Figure 7:
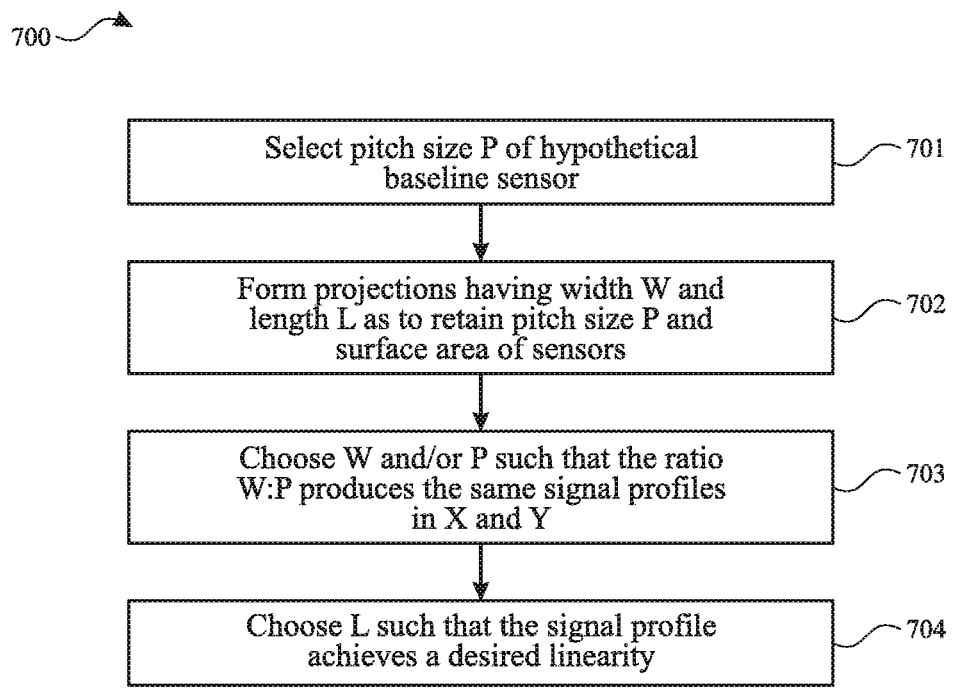
FIG. 7 is a flowchart of an exemplary method for selecting sensor dimensions in a two-dimensional interleaving configuration for use in a touch sensor panel according to examples of the disclosure.

FIG. 7 is a flowchart 700 of an exemplary method for selecting sensor dimensions in a two-dimensional interleaving configuration for use in a touch sensor panel according to examples of the disclosure. First, the pitch size P can be chosen (701) based on the configuration of the touch sensor panel or other design criteria. In some examples, this step can be performed with reference to a hypothetical square sensor (e.g., a sensor without projections). Second, projections can be either formed or simulated (702). In some examples, the projections can be formed as to retain the chosen pitch size of the sensors (e.g., the pitch size of the square sensor) and to retain the chosen surface area of each sensor (e.g., the surface area of the square sensor). Third, the projection width, W, can be selected (703) as to make the signal profiles of both the left sensor and the right sensor to be equal in both the x-direction and y-direction. Fourth, the projections length, L, can be chosen (704) such that a desired signal profile is achieved. In some examples, an acceptable signal profile can have 12-30% of a signal detected when a stylus is over the midpoint of an adjacent sensor, and even more wobble error reduction can be observed when this percentage is 15-20%.

Figure 8A:
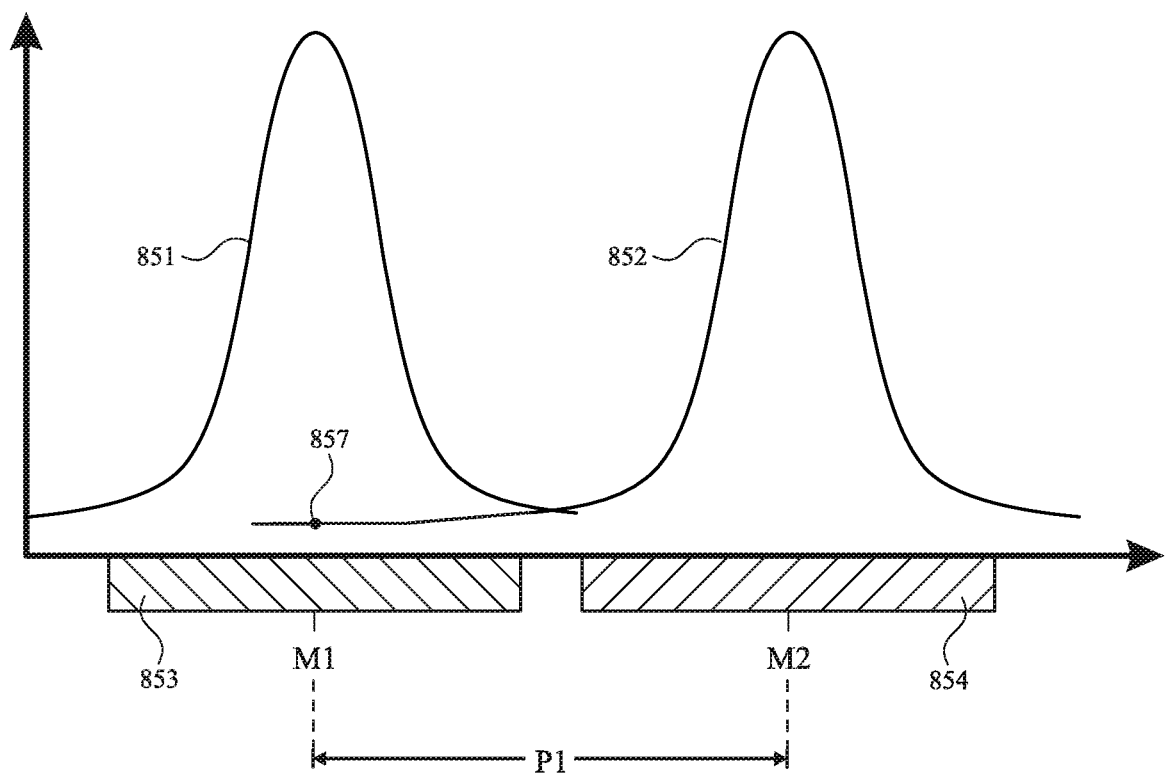
FIGS. 8A-8B compare signal profiles corresponding to non-interleaving sensors and interleaving sensors according to examples of the disclosure.
Figure 8B:
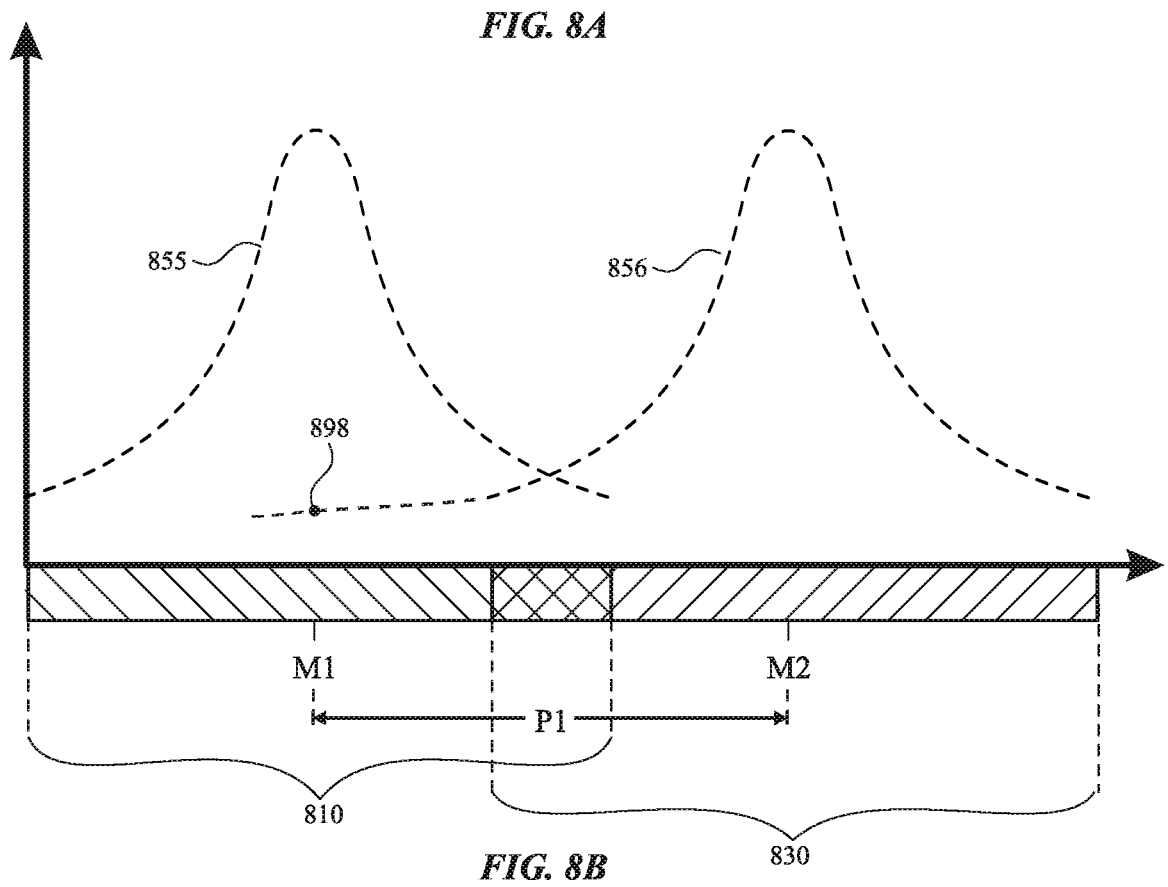

FIGS. 8A-8B illustrate a comparison of signal profiles associated with sensors not having interleaving projections (shown in FIG. 8A) and signal profiles associated with sensors having interleaving projections. FIG. 8A illustrates example signal profiles for two touch sensors 853 and 854 in a non-interleaving configuration (e.g., a square sensor without projections such as the configuration shown in FIG. 2). FIG. 8B illustrates example signal profiles for two sensors 810 and 830 in an interleaving configuration (e.g., one of the configurations shown in FIG. 5A-5B or 6A-6B). The x-axes of the graphs in both FIGS. 8A-8B represent the position of an object (e.g., a stylus) along an x-direction of a touch sensor panel, and the y-axes represent the normalized signal amplitude detected at the respective sensor at each point along the x-axis, as similarly described above with reference to FIGS. 4A-4B. For reference, the positions of example touch sensors are represented as rectangles under the x-axis in both FIGS. 8A-8B. In FIG. 8B, touch sensors are shown as overlapping as to indicate the projections which interleave in the x-direction (e.g., projections 614, 615 and 633 in FIG. 6A). For ease of comparison, each of the example touch sensors corresponding to the signal profiles in FIGS. 8A-8B is assumed to have the same pitch, P1.

FIG. 8A illustrates an example of two signal profiles 851 and 852 corresponding to two touch sensors without interleaving projections. As shown in FIG. 8A, because each touch sensor does not have projections, the signal profile for each touch sensor can be narrower than signal profiles corresponding to sensors with interleaving projections (e.g., the signal profiles illustrated in FIG. 8B). For example, referring to FIG. 8A, if a stylus is positioned at the midpoint M1 of sensor 853, the signal received on adjacent touch sensor 852 (point 857) can be only approximately 9% of the maximum signal detected on touch sensor 854 (e.g., the signal profile at midpoint M2).

FIG. 8B illustrates an example of two signal profiles 855 and 856 corresponding to two adjacent example sensors 810 and 830 in an exemplary interleaving configuration (e.g., the configuration illustrated in FIG. 5A or 6A). Because projections interleave with projections of an adjacent sensor, more signal is detected on a sensor the stylus moves from the midpoint of the sensor. Thus, if a stylus is positioned at the midpoint M1 of sensor 810, the signal received on adjacent touch sensor 830 (point 858) can be 15.3% of the maximum signal detected on touch sensor 830 (e.g., the signal profile at midpoint M2). This spreading can make the signal profile of each touch sensor wider, and thus, more linear in the interleaving configuration. As discussed above, signal profiles that are more spread, and consequently, more linear, can correlate with lower wobble error in the touch sensor panel.

Figure 9A:
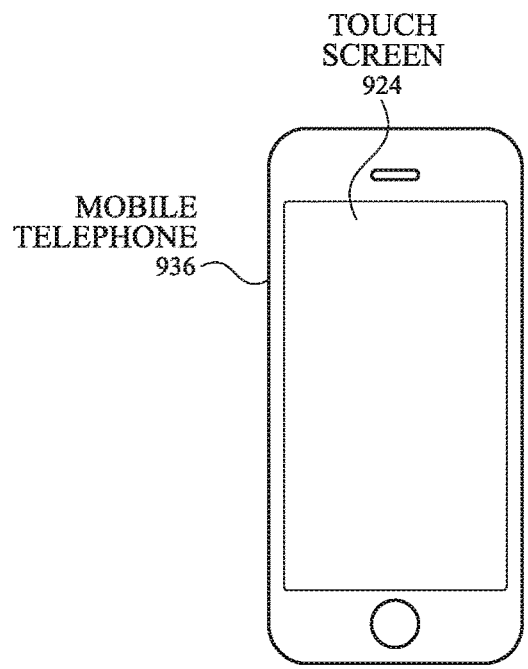
FIGS. 9A-9D illustrate example systems that can implement the interleaving touch sensor configurations for reducing wobble error according to examples of the disclosure.
Figure 9B:
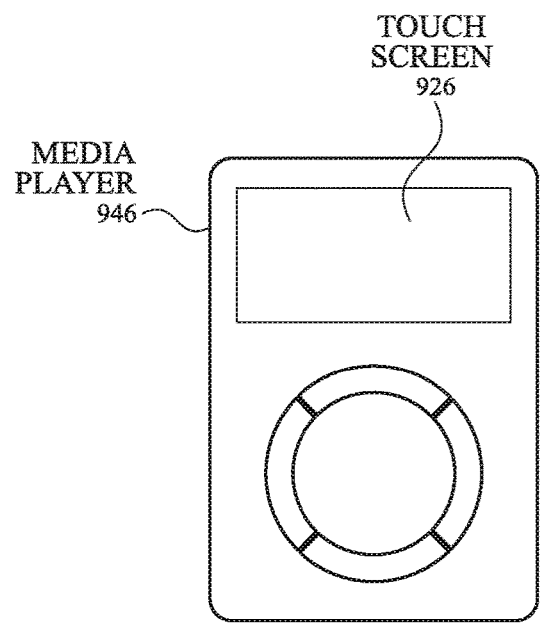
Figure 9C:
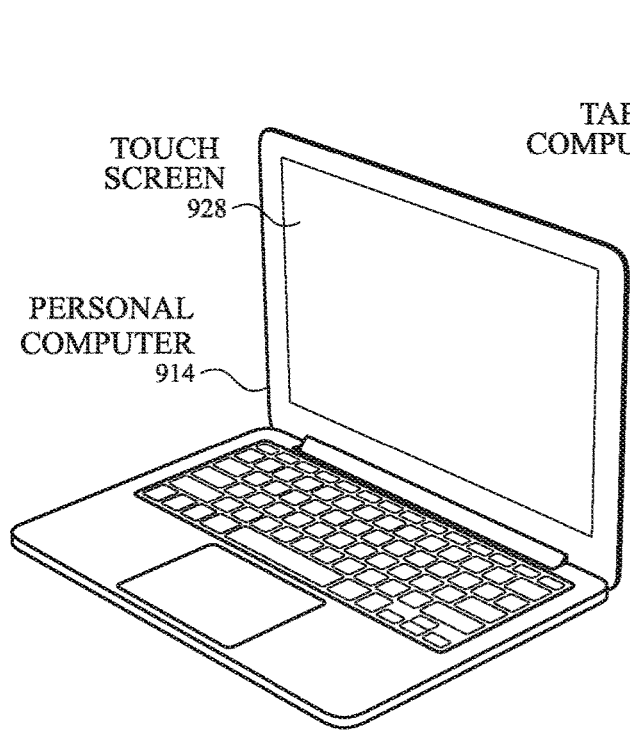
Figure 9D:
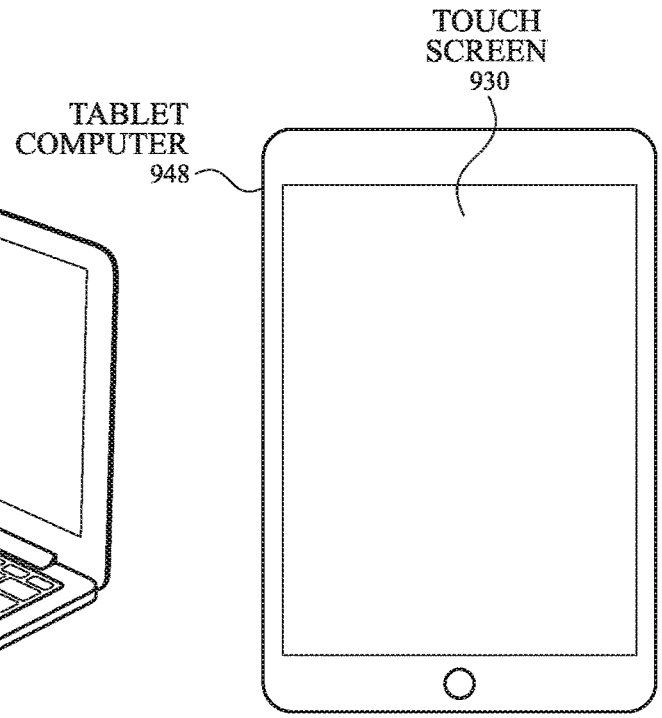

FIGS. 9A-9D illustrate example systems in which the interleaving sensors for reducing wobble error according to examples of the disclosure can be implemented. FIG. 9A illustrates an example mobile telephone 936 that includes a touch sensor panel 924 that can implement the interleaving sensors for reducing wobble error according to various examples. FIG. 9B illustrates an example digital media player 940 that includes a touch sensor panel 926 that can implement the interleaving sensors for reducing wobble error according to various examples. FIG. 9C illustrates an example personal computer 944 that includes a touch sensor panel 928 that can implement the interleaving sensors for reducing wobble error according to various examples. FIG. 9D illustrates an example tablet computing device 948 that includes a touch sensor panel 930 that can implement the interleaving sensors for reducing wobble error according to various examples. The touch sensor panel and computing system blocks that can implement the interleaving sensors for reducing wobble error can be implemented in other devices including in wearable devices.

Thus, the examples of the disclosure provide various interleaving sensor configurations to make the signal profile associated with the touch sensor more linear, thus reducing wobble error and increasing touch sensor panel performance.

Therefore, according to the above, some examples of the disclosure are directed to a touch sensor panel comprising: a plurality of electrically isolated electrodes; a first electrode of the plurality of electrodes having a first form and a first surface area; a second electrode of the plurality of electrodes having a second form and a second surface area; wherein: the first electrode includes a first set of projections in a first dimension, each projection of the first set of projections having one of one or more first projection surface areas; the second electrode includes a second set of projections in the first dimension, each projection of the second set of projections having one of one or more second projection surface areas, each of the one or more second projection surface areas being different from each of the one or more first projection surface areas; the first electrode is interleaved with the second electrode using the first set of projections and the second set of projections; and the first surface area, including the respective first projection surface areas, is substantially the same as the second surface area, including the respective second projection surface areas Additionally or alternatively to one or more of the examples disclosed above, in some examples, the plurality of electrically isolated electrodes are deposited on a first layer. Additionally or alternatively to one or more of the examples disclosed above, in some examples, the respective first projection surface areas of each of the first set of projections are equal, and the respective second projection surface areas of each of the second set of projections are equal. Additionally or alternatively to one or more of the examples disclosed above, in some examples, a first projection of the first set of projections forms a T-shape; a first projection of the second set of projections forms an L-shape; and the first projection of the first set of projections interdigitates with the first projection of the second set of projections. Additionally or alternatively to one or more of the examples disclosed above, in some examples, the first form includes a first shape that is symmetric about a first axis; and the second form includes a second shape that is symmetric about the first axis. Additionally or alternatively to one or more of the examples disclosed above, in some examples, the first shape is symmetric about a second axis; and the second shape is symmetric about the second axis. Additionally or alternatively to one or more of the examples disclosed above, in some examples, the first form includes a first orientation and a first shape; the second form includes a second orientation and a second shape; and the first form is different than the second form. Additionally or alternatively to one or more of the examples disclosed above, in some examples, the first orientation of the first form is in the first dimension; the second orientation of the first form is orthogonal to the first orientation; and the second shape of the second form is the same as the first shape of the first form. Additionally or alternatively to one or more of the examples disclosed above, in some examples, the first shape of the first form is different than the second shape of the second form. Additionally or alternatively to one or more of the examples disclosed above, in some examples, the touch sensor panel further comprises a third electrode having third form and a third surface area; wherein the third electrode includes a third set of projections in a second dimension; the first electrode further includes a fourth set of projections in the second dimension; and the first electrode is interleaved with the third electrode using the fourth set of projections and the third set of projections. Additionally or alternatively to one or more of the examples disclosed above, in some examples, the second dimension is orthogonal to the first dimension. Additionally or alternatively to one or more of the examples disclosed above, in some examples, the third form of the third electrode is the same as the second form. Additionally or alternatively to one or more of the examples disclosed above, in some examples, the first electrode is associated with a first signal profile representing a plurality of signal measurements at the first electrode in the first dimension; and the second electrode is associated with a second signal profile representing a plurality of signal measurements at the second electrode in the first dimension. Additionally or alternatively to one or more of the examples disclosed above, in some examples, each of the first set of projections has a first width and first length; each of the second set of projection has a second width and second length; the first width and first length determine the first signal profile; the second width and second length determine the second signal profile; the first width and first length are optimized such that the first signal profile includes: a maximum signal measurement at a midpoint of the first electrode, and a first signal measurement at a midpoint of the second electrode greater than or equal to 12% of the maximum signal measurement at the midpoint of the first electrode; and the second width and second length are optimized such that the second signal profile includes: a maximum signal measurement at the midpoint of the second electrode, and a second signal measurement at the midpoint of the first electrode greater than or equal to 12% of the maximum signal measurement at the midpoint of the second electrode. Additionally or alternatively to one or more of the examples disclosed above, in some examples, the first signal measurement at the midpoint of the second electrode is less than 30% of the maximum signal measurement at the midpoint of the first electrode. Additionally or alternatively to one or more of the examples disclosed above, in some examples, the first signal measurement at the midpoint of the second electrode varies by less than 27% from the second signal measurement at the midpoint of the first electrode. Additionally or alternatively to one or more of the examples disclosed above, in some examples, the first electrode is further associated with a third signal profile representing a plurality of signal measurements at the first electrode in a second dimension, different from the first, the third signal profile varies by less than 27% from the first signal profile. Additionally or alternatively to one or more of the examples disclosed above, in some examples, the first electrode is further associated with a third signal profile representing a plurality of signal measurements at the first electrode in a second dimension, different from the first, the third signal profile varies by less than 27% from the first signal profile.

Some examples of the disclosure are directed to a method of forming a touch sensor panel comprising: forming a first and second electrode, wherein first projections of the first electrode interleave with second projections of the second electrode; selecting dimensions of the first and second projections such that: the first projections each have a first projection surface area; the second projections each have a second projection surface area, different from the first projection surface area; the first electrode has a first total surface area; and the second electrode has a total surface area equal to the first total surface area. Additionally or alternatively to one or more of the examples disclosed above, in some examples, the method further comprises selecting the dimensions of the first and second projections such that: the first projections are different from the second projections. Additionally or alternatively to one or more of the examples disclosed above, in some examples, the method further comprises selecting the dimensions of the first and second projections such that: the first projections are symmetric about a first axis; and the second projections are symmetric about the first axis. Additionally or alternatively to one or more of the examples disclosed above, in some examples, the method further comprises selecting the dimensions of the first and second projections such that: the first projections are symmetric about a second axis; and the second projections are symmetric about the second axis. Additionally or alternatively to one or more of the examples disclosed above, in some examples, the method further comprises selecting the dimensions of the first and second projections such that: a baseline electrode without projections has a total surface area equal to the first total surface area; and a first signal measurement at the first electrode at a first distance from the first electrode is greater than a baseline signal measurement at the baseline electrode at the first distance from the baseline electrode. Additionally or alternatively to one or more of the examples disclosed above, in some examples, the method further comprises selecting the dimensions of the first and second projections such that: a second signal measurement at the second electrode at the first distance from the second electrode is greater than the baseline signal measurement; and the second signal measurement substantially matches the first signal measurement. Additionally or alternatively to one or more of the examples disclosed above, in some examples, a distance between a midpoint of the first electrode and a midpoint of the second electrode is equal to the first distance; the first signal measurement is greater than or equal to 12% of a first maximum signal measurement at the first electrode at the midpoint of the first electrode. Additionally or alternatively to one or more of the examples disclosed above, in some examples, the first signal measurement is less than 30% of the first maximum signal measurement.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

The invention claimed is:
1. A touch sensor panel comprising:
  a plurality of electrodes, including a first electrode having a first shape and a first surface area, and a second electrode having a second shape and a second surface area, wherein the first and the second electrode are sensed for touch,
  wherein:
    a magnitude of the first surface area is substantially the same as a magnitude of the second surface area, the first shape of the first electrode is different than the second shape of the second electrode, the first electrode includes a first projection having a first portion and a second portion, the first portion of the first projection having a first form and a first width, and the second portion of the first projection having a second form and a second width, wherein the second form is different than the first form and the second width is different than the first width, the second electrode includes a first recess having a first portion and a second portion, the first portion of the first recess having the first form, and the second portion of the first recess having the second form, the first portion of the first projection is disposed within the first portion of the first recess, and the second portion of the first projection is disposed within the second portion of the first recess.

2. The touch sensor panel of claim 1, wherein:
a length of the first electrode and the second electrode along a first axis is a first length, and
a distance between a center of the first electrode and a center of the second electrode along a second axis, different than the first axis, is the first length.

3. The touch sensor panel of claim 2, wherein the first electrode and the second electrode are disposed adjacent to each other along the second axis.

4. The touch sensor panel of claim 1, wherein the first electrode and the second electrode are disposed adjacent to each other along a respective axis, and the second electrode does not include a recess on an edge of the second electrode that is parallel to the respective axis.

5. The touch sensor panel of claim 1, wherein the first projection of the first electrode has a T shape, and the first recess of the second electrode has the T shape.

6. The touch sensor panel of claim 1, wherein the plurality of electrodes are disposed in a same material layer of the touch sensor panel.

7. The touch sensor panel of claim 1, wherein the first electrode and the second electrode are disposed adjacent to each other along a respective axis, and the first shape and the second shape are symmetric along the respective axis.

8. The touch sensor panel of claim 1, wherein
the first electrode and the second electrode are disposed adjacent to each other along a respective axis,
the second electrode includes a plurality of projections that form the first recess,
the first electrode is associated with a first signal profile representing a plurality of signal measurements at the first electrode along the respective axis, and
the second electrode is associated with a second signal profile representing a plurality of signal measurements at the second electrode along the respective axis.

9. The touch sensor panel of claim 8, wherein:
the first projection of the first electrode determines the first signal profile;
the plurality of projections of the second electrode determine the second signal profile;
the first projection is optimized such that the first signal profile includes:
a maximum signal measurement at a midpoint of the first electrode, and
a first signal measurement at a midpoint of the second electrode greater than or equal to 12% of the maximum signal measurement at the midpoint of the first electrode; and
the plurality of projections are optimized such that the second signal profile includes:

a maximum signal measurement at the midpoint of the second electrode, and
a second signal measurement at the midpoint of the first electrode greater than or equal to 12% of the maximum signal measurement at the midpoint of the second electrode.

10. The touch sensor panel of claim 9, wherein:
the first signal measurement at the midpoint of the second electrode is less than 30% of the maximum signal measurement at the midpoint of the first electrode.

11. The touch sensor panel of claim 9, wherein:
the first signal measurement at the midpoint of the second electrode varies by less than 27% from the second signal measurement at the midpoint of the first electrode.

12. The touch sensor panel of claim 1, wherein the plurality of electrodes is configured to sense signal from a stylus.

13. The touch sensor panel of claim 1, wherein the first portion of the first projection has the first width at a first distance from a center of the first electrode, and the second portion of the first projection has the second width at a second distance, different from the first distance, from the center of the first electrode.

14. The touch sensor panel of claim 1, wherein the first projection of the first electrode is configured to have a first signal profile, a midpoint of the first electrode is configured to have a second signal profile, and the second signal profile is greater than the first signal profile.

15. A method of forming a touch sensor panel, the method comprising:
forming a plurality of electrodes, including a first electrode having a first shape and a first surface area, and a second electrode having a second shape and a second surface area, wherein the first and the second electrode are sensed for touch,
wherein:
a magnitude of the first surface area is substantially the same as a magnitude of the second surface area,
the first shape of the first electrode is different than the second shape of the second electrode,
the first electrode includes a first projection having a first portion and a second portion, the first portion of the first projection having a first form and a first width, and the second portion of the first projection having a second form and a second width, the second form different than the first form and the second width different than the first width,
the second electrode includes a first recess having a first portion and a second portion, the first portion of the first recess having the first form, and the second portion of the first recess having the second form,
the first portion of the first projection is disposed within the first portion of the first recess, and
the second portion of the first projection is disposed within the second portion of the first recess.

16. The method of claim 15, wherein:
a length of the first electrode and the second electrode along a first axis is a first length, and a distance between a center of the first electrode and a center of the second electrode along a second axis, different than the first axis, is the first length.

17. The method of claim 15, wherein the first electrode and the second electrode are disposed adjacent to each other along a respective axis, and the second electrode does not include a recess on an edge of the second electrode that is parallel to the respective axis.

18. The method of claim 15, wherein the plurality of electrodes are disposed in a same material layer of the touch sensor panel.

19. The method of claim 15, wherein the first electrode and the second electrode are disposed adjacent to each other along a respective axis, and the first shape and the second shape are symmetric along the respective axis.

20. A method of operating a touch sensor panel, the method comprising:
   sensing touch signals at a plurality of electrodes, including a first electrode having a first shape and a first surface area, and a second electrode having a second shape and a second surface area, wherein the first and the second electrode are sensed for touch,
   wherein:
      a magnitude of the first surface area is substantially the same as a magnitude of the second surface area,
      the first shape of the first electrode is different than the second shape of the second electrode,
      the first electrode includes a first projection having a first portion and a second portion, the first portion of the first projection having a first form and a first width, and the second portion of the first projection having a second form and a second width, the first form different than the second form and the first width different than the second width,
      the second electrode includes a first recess having a first portion and a second portion, the first portion of the first recess having the first form, and the second portion of the first recess having the second form,
      the first portion of the first projection is disposed within the first portion of the first recess, and
      the second portion of the first projection is disposed within the second portion of the first recess.

21. The method of claim 20, wherein:
   a length of the first electrode and the second electrode along a first axis is a first length, and
   a distance between a center of the first electrode and a center of the second electrode along a second axis, different than the first axis, is the first length.

22. The method of claim 20, wherein the first electrode and the second electrode are disposed adjacent to each other along a respective axis, and the second electrode does not include a recess on an edge of the second electrode that is parallel to the respective axis.

23. The method of claim 20, wherein the plurality of electrodes are disposed in a same material layer of the touch sensor panel.

24. The method of claim 20, wherein the first electrode and the second electrode are disposed adjacent to each other along a respective axis, and the first shape and the second shape are symmetric along the respective axis.

* * * * *